(12) United States Patent
Gindentuller et al.

(10) Patent No.: US 9,060,046 B2
(45) Date of Patent: Jun. 16, 2015

(54) METHOD AND APPARATUS FOR TRANSFERRING MEDIA DATA BETWEEN DEVICES

(75) Inventors: Ilya Gindentuller, San Diego, CA (US); David Schick, San Diego, CA (US); Kit Sonny Wong, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1596 days.

(21) Appl. No.: 12/192,261

(22) Filed: Aug. 15, 2008

(65) Prior Publication Data

US 2009/0210546 A1 Aug. 20, 2009

Related U.S. Application Data

(60) Provisional application No. 61/029,482, filed on Feb. 18, 2008.

(51) Int. Cl.
*G06F 15/16* (2006.01)
*H04L 29/06* (2006.01)
*H04L 29/08* (2006.01)

(52) U.S. Cl.
CPC .............. *H04L 65/604* (2013.01); *H04L 67/06* (2013.01)

(58) Field of Classification Search
USPC .......................... 709/230, 231, 232, 233, 248
See application file for complete search history.

(56) References Cited

U.S. PATENT DOCUMENTS

| 2007/0033327 A1* | 2/2007 | Sinclair | 711/103 |
| 2008/0101598 A1* | 5/2008 | Dillaway | 380/44 |
| 2009/0168650 A1* | 7/2009 | Kesselman | 370/235 |

* cited by examiner

*Primary Examiner* — Liangche A Wang
*Assistant Examiner* — Cheikh Ndiaye
(74) *Attorney, Agent, or Firm* — Fish & Richardson P.C.

(57) ABSTRACT

A method (300) and apparatus (100) for transferring media data between devices is disclosed. The method may include receiving (320) media data transfer protocol data and splitting (330) the media data transfer protocol data into media data transfer protocol control data and a media data transfer protocol bulk data. The method may also include transferring (340) the media data transfer protocol control data over a first channel to a media data transfer protocol data synchronization application and transferring (350) the media data transfer protocol bulk data over a second channel substantially directly to memory (170) substantially simultaneously with transferring the media data transfer protocol control data over the first channel.

20 Claims, 6 Drawing Sheets

METHOD AND APPARATUS FOR TRANSFERRING MEDIA DATA BETWEEN DEVICES

BACKGROUND

1. Field

The present disclosure is directed to a method and apparatus for transferring media data between devices. More particularly, the present disclosure is directed to transferring media data or protected data from one device to a memory of another device using a transfer protocol.

2. Introduction

Presently, devices can synchronize with other devices to transfer media data between the devices. For example, a portable media player using a media synchronization application can connect with a personal computer media player to synchronize media, such as music, videos, and other data between the devices. Unfortunately, the synchronization may take a considerable amount of time to transfer the media data depending on the amount of media data that is transferred between the devices. The synchronization may also incur additional delays due to the transfer speed of the connection and media transfer overhead involved in the transfer. As media transfer time is minimized due to faster connection transfer speeds, media transfer overhead can become the dominant component of the transfer time, and thus can become a limiting factor to how fast media can be transferred between devices. This media transfer overhead can include setup data and commands, control data and commands, metadata of the media, and other media transfer overhead. Thus, future improvements to media synchronization must consider overhead reduction for improved efficiency.

For example, there are several digital rights management-aware data transfer protocols, a.k.a. media data transfer protocols (MDTP), that can be used to transfer large amounts of media data between a host personal computer and a media player device. Different media players and different personal computers may use different digital rights management-aware transfer protocols. Devices, systems, and programs that use different digital rights management-aware transfer protocols can include iPods, Zunes, Music On Demand, iTunes, Windows Media Player, Media Transfer Protocol, Packet Video application, and other devices, systems, and programs. Due to concerns from media service providers over possible digital rights management violations, different media service providers require users to use different devices and/or different applications on the devices to be able to limit access to media, such as music and video services. As a result of such concerns over digital rights management violations, some media service providers require all the media data must be copied from a source device into memory on the destination device using only a specific media synchronization application. This requirement creates a throughput bottleneck in the media synchronization application, which limits overall system data throughput. As a result, a user's experience suffers due to enormously long media synchronization times.

Thus, there is a need for an improved method and apparatus for transferring media data between devices.

SUMMARY

A method and apparatus for transferring media data between devices is disclosed. The method may include receiving media data transfer protocol data and splitting the media data transfer protocol data into media data transfer protocol control data and a media data transfer protocol bulk data. The method may also include transferring the media data transfer protocol control data over a first channel to a media data transfer protocol data synchronization application and transferring the media data transfer protocol bulk data over a second channel substantially directly to memory substantially simultaneously with transferring the media data transfer protocol control data over the first channel.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
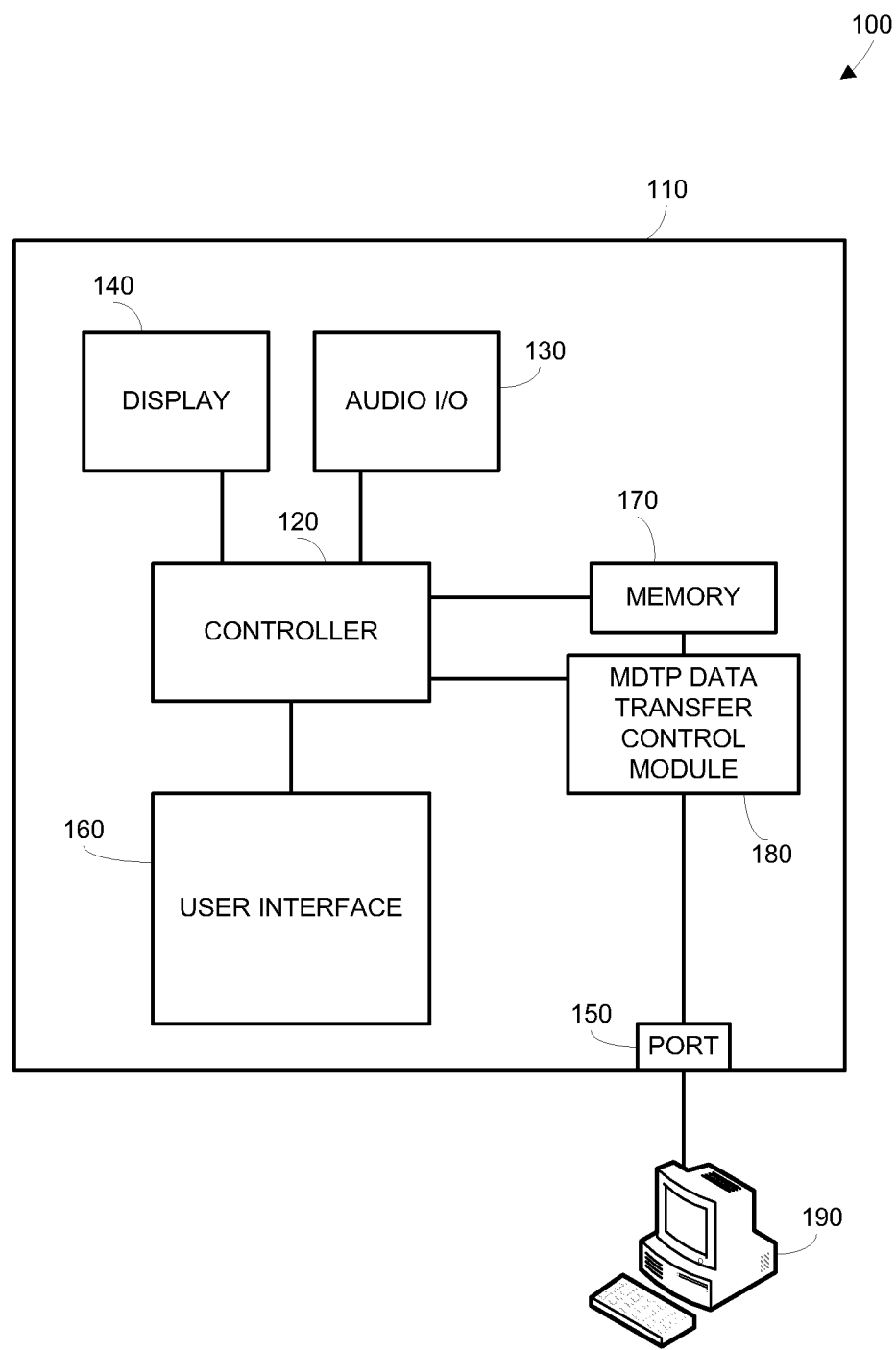
FIG. 1 is an exemplary block diagram of an apparatus according to one embodiment.

FIG. 1 is an exemplary block diagram of an apparatus 100 according to one embodiment. The apparatus 100 may be a media player device, a portable music player, a wireless telephone, a cellular telephone, a personal digital assistant, a personal computer, a selective call receiver, or any other device that is capable of storing media. The apparatus 100 can include a housing 110, a controller 120 coupled to the housing 110, audio input and output circuitry 130 coupled to the housing 110, a display 140 coupled to the housing 110, a port 150 coupled to the housing 110, a user interface 160 coupled to the housing 110, and a memory 170 coupled to the housing 110. The apparatus 100 can also include a media data transfer protocol (MDTP) data transfer control module 180. The MDTP data transfer control module 180 can be coupled to the controller 120, can reside within the controller 120, can reside within the memory 170, can be an autonomous module, can be software, can be hardware, or can be in any other format useful for a module on an apparatus 100.

The display 140 can be a liquid crystal display (LCD), a light emitting diode (LED) display, a plasma display, or any other means for displaying information. The audio input and output circuitry 130 can include a microphone, a speaker, a transducer, a headset jack, a wireless headset interface, or any other audio input and output circuitry. The user interface 160 can include a keypad, buttons, a touch pad, a joystick, an additional display, or any other device useful for providing an interface between a user and an electronic device. The memory 170 may include a removable memory, such as a removable flash memory card, may include an external memory, such as an external hard drive, may include an internal memory, such as a random access memory or a hard drive memory, may include a read only memory, may include an optical memory, may include a subscriber identity module memory, or may include any other memory that can be coupled to an apparatus.

In operation, the port 150 can be a data transfer port that can couple the apparatus 100 to another device using any means useful to send and receive data via MDTP. The port 150 may be a universal serial bus port, a media player synchronization port, a Bluetooth interface, a wireless interface, or any other port that can transfer data between two devices. The controller 120 can include a MDTP synchronization application configured to process the MDTP data received via the port 150. The memory 170 can store the MDTP data. The MDTP data transfer control module 180 can split the MDTP data into MDTP control data and MDTP bulk data. The MDTP data transfer control module 180 can split the MDTP data by examining a header portion of every data packet received of the MDTP data, such as from a MDTP data transfer application on another device 190. The header content can indicate whether the packet includes MDTP control data or MDTP bulk data. The MDTP data transfer control module 180 can provide for on-the-fly data routing of the MDTP bulk data substantially directly to the memory 170 while substantially simultaneously providing MDTP control data to an appropriate control module.

For example, the MDTP data transfer control module 180 can transfer the MDTP control data over a first channel to the MDTP data synchronization application. The MDTP data transfer control module 180 can transfer the MDTP bulk data over a second channel substantially directly or directly to the memory 170 substantially simultaneously or simultaneously with transferring the MDTP control data over the first channel to the MDTP data synchronization application. The MDTP bulk data can be transferred over a second channel substantially directly to the memory 170 by bypassing a MDTP data synchronization application while the MDTP control data is transferred over the first channel to the MDTP data synchronization application.

The MDTP data synchronization application can synchronize MDTP data with a MDTP data transfer application on the other device 190. The MDTP data synchronization application can process the MDTP data received via the port 150 to synchronize MDTP data stored on the apparatus 110 with MDTP data on the other device 190. The MDTP data transfer control module 180 can transfer metadata and data transfer protocol commands of the MDTP data over the first channel to the MDTP data synchronization application.

According to a related embodiment, the port 150 can be a data transfer port configured to receive MDTP data including media data. The controller 120 can include a MDTP media synchronization application configured to process the MDTP data received via the data transfer port 150. The memory 170 can be configured to store MDTP bulk data. The MDTP data transfer control module 180 can be configured to split the MDTP data into MDTP control data and MDTP bulk data. The MDTP data transfer control module 180 can be configured to transfer the MDTP control data over a first channel to the MDTP data synchronization application. The MDTP data transfer control module 180 can be configured to transfer the MDTP bulk data over a second channel substantially directly to the memory 170 while transferring the MDTP control data over the first channel to the MDTP data synchronization application.

The MDTP data transfer control module 180 can be configured to create an empty space table based on empty space in the memory 170. The MDTP data transfer control module 180 can be configured to transfer the MDTP bulk data by writing the MDTP bulk data substantially directly into the memory 170 based on the empty space table.

Figure 2:
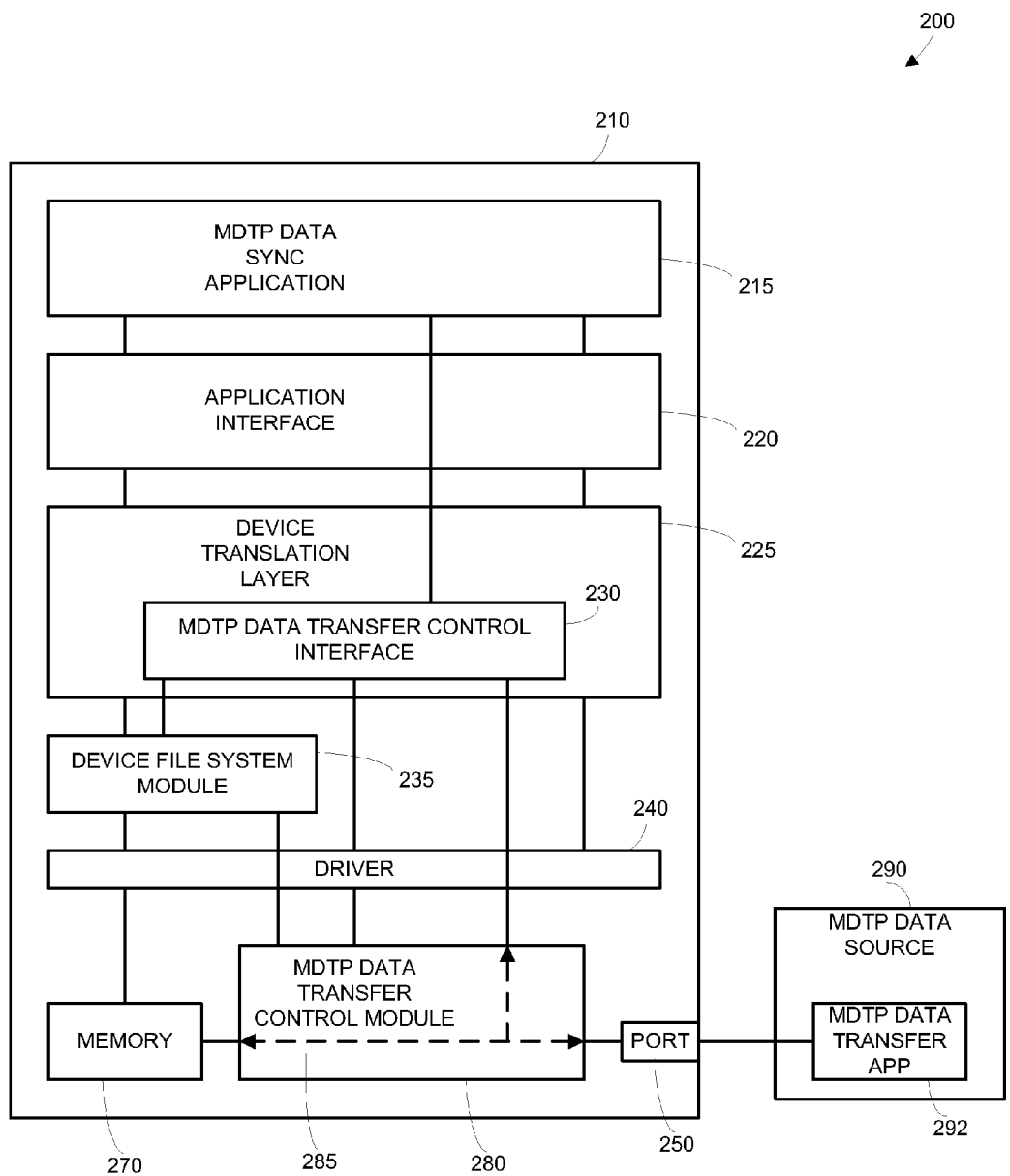
FIG. 2 is an exemplary block diagram of an apparatus according to one embodiment.

FIG. 2 is an exemplary block diagram of an apparatus 200 according to one embodiment. The apparatus 200 can include some or all of the elements of the apparatus 100 and can operate in a similar manner to the apparatus 100. The apparatus 200 can include a housing 210, a MDTP data synchronization application 215, an application interface 220, a device translation layer 225, a MDTP data transfer control interface 230, a device file system module 235, a driver 240, a port 250, a memory 270, and a MDTP transfer control module 280. The port 250 can couple the apparatus 200 to a MDTP data transfer or synchronization application 292 on another device, such as a MDTP data source 290.

Different elements of the apparatus 200 may be located within the controller 120 of the apparatus 100 or various elements may operate as autonomous modules. For example, the controller 120 may include the MDTP data transfer control module 280. Alternately, the MDTP data transfer control module 280 may be located in a dedicated second controller. As a further example, the controller 120 can include a peripheral microcontroller driver that is a software agent that can control the second controller including the MDTP data transfer control module 280. The second controller including the MDTP data transfer control module 280 may be a peripheral microcontroller.

The MDTP data transfer control module 280 can create an empty space table based on empty space in the memory 270. The MDTP data transfer control module 280 can transfer 285 the MDTP bulk data by writing the MDTP bulk data substantially directly into the memory 270 based on the empty space table. Also, the MDTP data transfer control interface 230 can create the empty space table based on empty space in the memory 270 and can send the empty space table to the MDTP data transfer control module 280. The MDTP data transfer control module 280 can then transfer the MDTP bulk data by writing the MDTP bulk data directly into the memory 270 based on the empty space table. The MDTP data transfer control module 285 can send data transfer updates to the MDTP data synchronization application 215.

As another example, the file system module 235 can manage memory storage space. The MDTP data transfer control interface 230 can request memory empty space information from the file system module 235. The MDTP data transfer control interface 230 can receive a memory empty space information response from the file system module 235. The memory empty space information response can include empty space addresses and lengths in the memory 270. The MDTP data transfer control interface 230 can create an empty space table based on the memory empty space information response. The MDTP data transfer control module 280 can then transfer the MDTP bulk data by writing the MDTP bulk data substantially directly into the memory 270 based on the empty space table.

The MDTP data transfer control module 280 can transfer the MDTP control data using digital rights management-aware protocol to the MDTP data synchronization application 215. The MDTP data transfer control module 280 can transfer 285 the MDTP bulk data over a second channel parallel to the first channel and external to the MDTP data synchronization application 215. Thus, MDTP data transfer control module 280 can bypass the MDTP data synchronization application 215 when transferring the MDTP bulk data to the memory 270.

According to another example, the file system module 235 can manage memory storage space. The MDTP data transfer control interface 230 can send a request to the file system module 235 for media data file space information regarding MDTP data in the memory 270. The MDTP data transfer control interface 230 can receive a media data file space information response from the file system module 235. The media data file space information response can include memory space addresses and lengths of memory space occupied by MDTP data in the memory 270. The MDTP data transfer control interface 230 can create a media data file space table based on the media data file space information response. The MDTP data transfer control interface 230 can read the MDTP data substantially directly or directly from the memory 270 based on the media data file space table.

Figure 3:
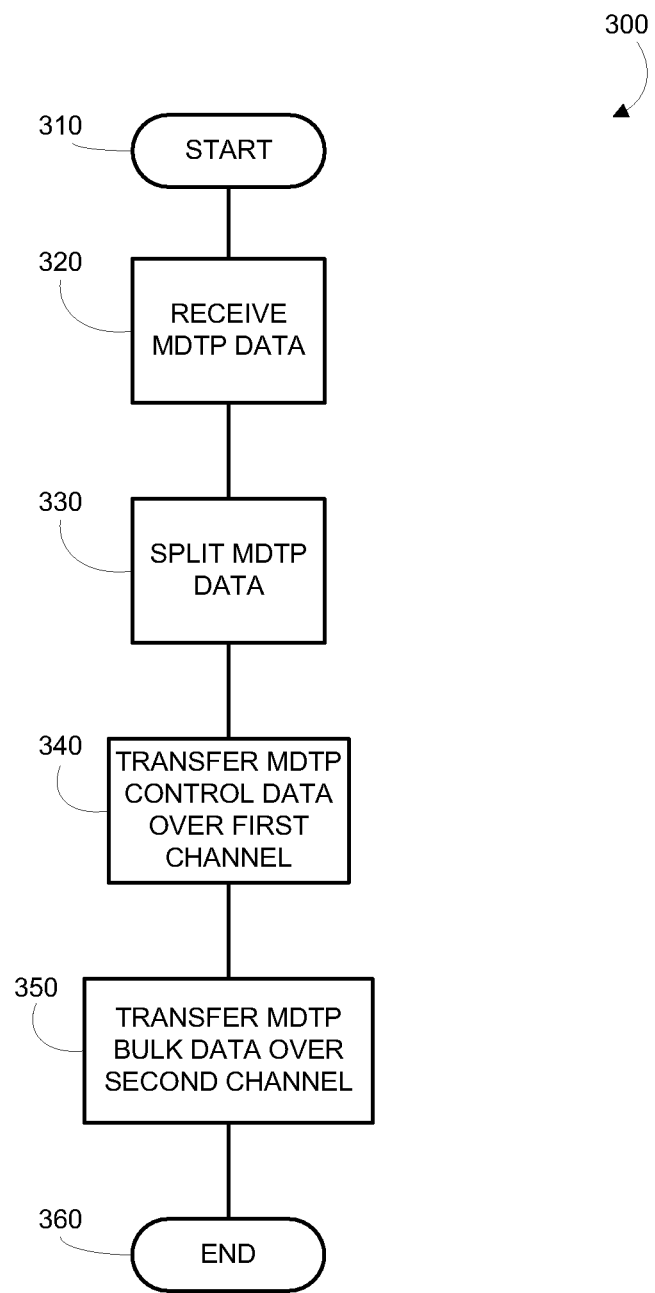
FIG. 3 is an exemplary flowchart illustrating the operation of an apparatus according to one embodiment.

FIG. 3 is an exemplary flowchart 300 illustrating the operation of the apparatus 100 according to another embodiment. At 310, the flowchart 300 begins. At 320, MDTP data can be received. The MDTP data can include digital rights management encrypted data, digital rights management encrypted media data, digital rights management encrypted music data, digital rights management encrypted video data, unencrypted media data, unencrypted music data, unencrypted video data, unencrypted MDTP data, or other data that can be transferred using a MDTP.

For example, the MDTP control data can include encrypted data, unencrypted data, or a combination of encrypted and unencrypted data that can allow digital rights management-related MDTP session setup and control activity. The MDTP control data can include subscriber verification data to facilitate MDTP transfer setup; can provide for MDTP transfer setup and control; can include MDTP setup data; can include metadata; can provide for song licenses; can provide for obfuscated digital rights management decryption keys; and can provide other digital rights management and media transfer sensitive information. Metadata can include protected or unprotected file title data, media title data, author data, date data, description data, and other metadata. The MDTP bulk data can include media bulk data that can be transferred using a MDTP. The MDTP bulk data can be unencrypted bulk data, such as unprotected music content, video content, or other relevant bulk data. The MDTP bulk data can also be encrypted bulk data.

At 330, the MDTP data can be split into MDTP control data and a MDTP bulk data. At 340, the MDTP control data can be transferred over a first channel to a MDTP data synchronization application. Transferring the MDTP control data can include transferring the MDTP control data using digital rights management-aware protocol to a MDTP data synchronization application. A MDTP data synchronization application can be a media synchronization application, such as a music synchronization application, a video synchronization application, or any other media synchronization application.

At 350, transferring the MDTP bulk data can be transferred over a second channel substantially directly to memory substantially simultaneously with transferring the MDTP control data over the first channel. The MDTP bulk data can be transferred over a second channel substantially directly to memory while the MDTP control data is transferred over the first channel to the digital rights management data synchronization application. At 350, the flowchart 300 can end.

Figure 4:
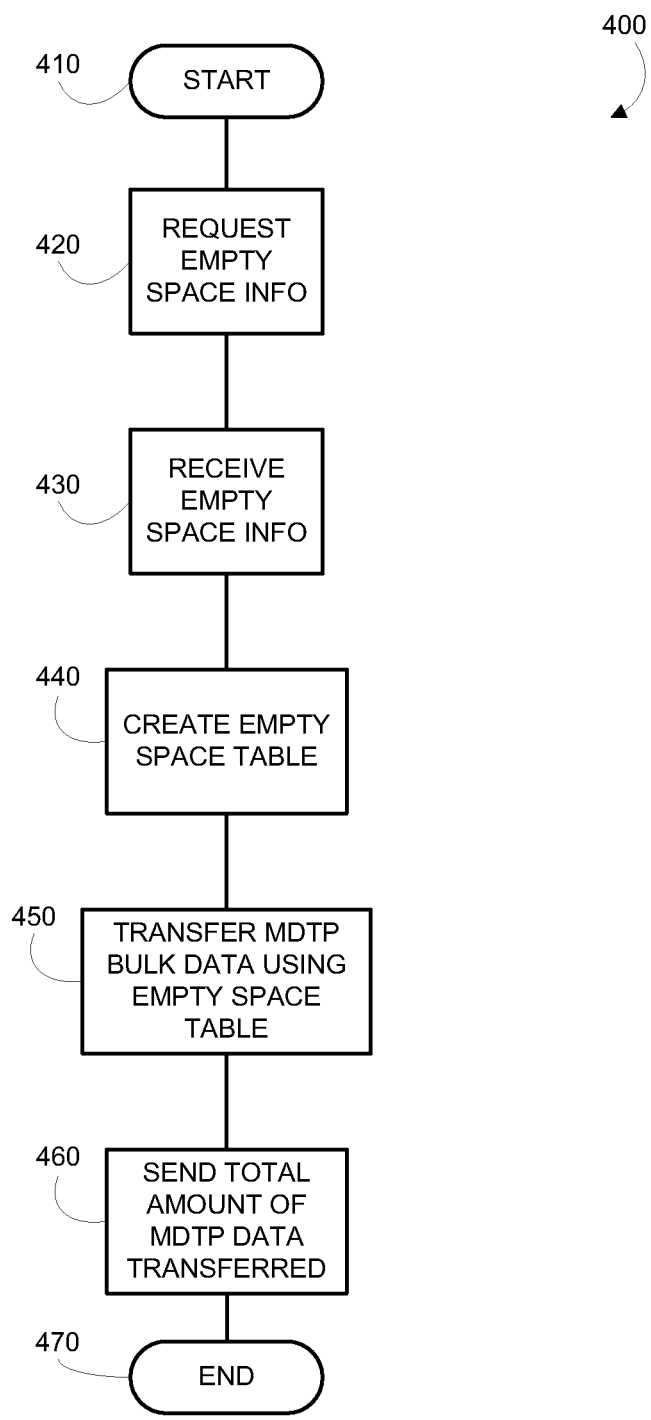
FIG. 4 is an exemplary flowchart illustrating the operation of an apparatus according to another embodiment.

FIG. 4 is an exemplary flowchart 400 illustrating the operation of the apparatus 100 according to another related embodiment. Elements of the flowchart 400 can be used with the flowchart 300. At 410, the flowchart 400 begins. At 420, memory empty space information can be requested from a file system module. At 430, a memory empty space information response can be received from the file system module. The memory empty space information response can include empty space addresses and lengths in the memory.

At 440, an empty space table can be created based on empty space in the memory. For example, a MDTP data transfer control interface can be used to create an empty space table based on empty space in the memory. The MDTP data transfer control interface can send the empty space table to a MDTP data transfer control module. The empty space table can be created based on the memory empty space information response. The empty space table can contain a description of some or all empty spaces in a memory. For example, the empty space table can contain a list of some or all of the empty blocks in the memory available for writing. The empty space table can get loaded into the MDTP data transfer control module. The empty space table can allow a device to quickly write data into the memory without referencing a file system for each individual physical write. This can increase data transfer speed by bypassing limitations of a device file system. If the empty space table is exhausted, the MDTP data transfer control module can request another empty space table. When the data transfer is done, additional information of the data transfer can be written to a file description in the memory to indicate what transferred blocks of data represent. This can make the new file known to a file system. Also, all or portions of the MDTP control data, such as song licenses, can be eventually stored in memory where MDTP bulk data is stored. Additionally, all or portions of the MDTP control data can be stored in other memory, such as in internal device memory, that may be different from the memory used to store the MDTP bulk data.

At 450, the MDTP bulk data can be transferred to memory by writing the MDTP bulk data substantially directly into the memory based on the empty space table. The MDTP data transfer control module can transfer the MDTP bulk data by writing, the MDTP bulk data directly into the memory based on the empty space table. Data transfer updates can be sent from the MDTP data transfer control module to a MDTP data synchronization application while writing the MDTP bulk data substantially directly into the memory.

At 460, upon completion of the MDTP bulk data transfer, the MDTP data transfer control module can send, to the MDTP data transfer control interface module, the total amount of MDTP bulk data transferred. The MDTP data transfer control interface module can then send this amount of bulk data to a device file system module that updates a file descriptor of the newly transferred file. At 470, the flowchart 400 can end.

Figure 5:
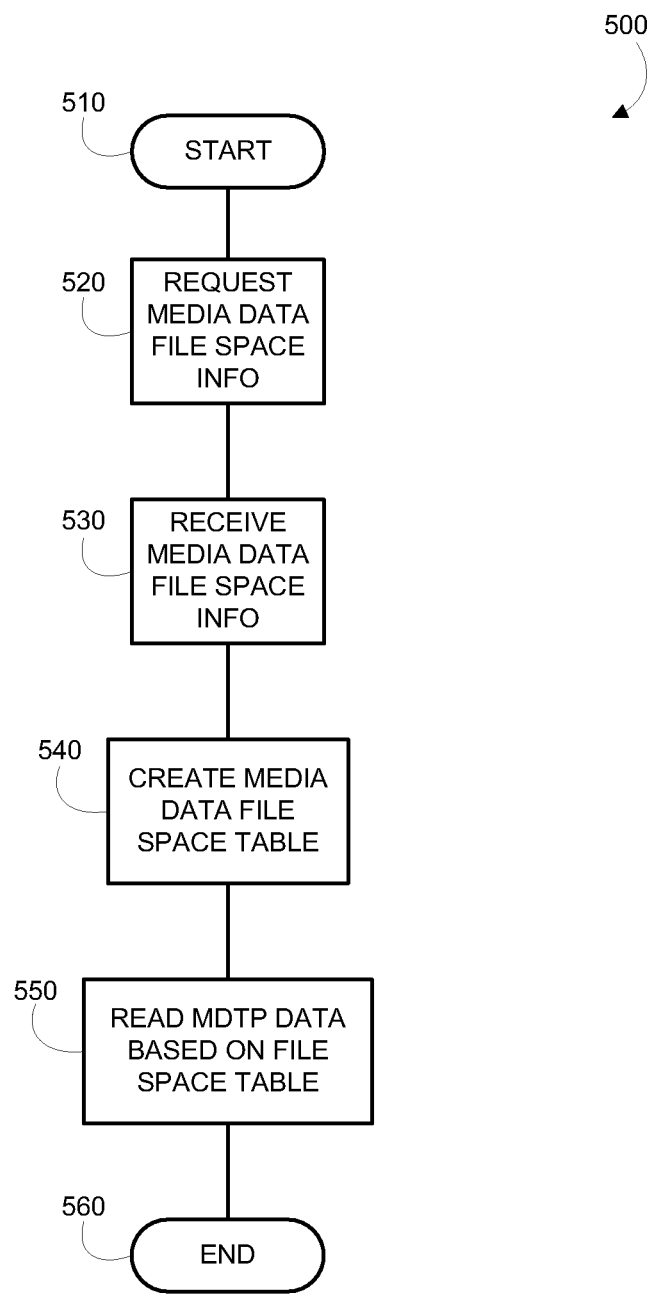
FIG. 5 is an exemplary flowchart illustrating the operation of an apparatus according to another embodiment.

FIG. 5 is an exemplary flowchart 500 illustrating the operation of the apparatus 100 according to another related embodiment. Elements of the flowchart 500 can be used with the flowcharts 300 and/or 400. The flowchart 500 can illustrate how MDTP data in a memory can be accessed. In many embodiments, the MDTP data can correspond to media data that has been, is being, or will be transferred using a MDTP. At 510, the flowchart 500 begins. At 520, a request can be sent for media data file space information regarding MDTP data in memory. At 530, a media data file space information response can be received. The media data file space information response can include memory space addresses and lengths of memory space occupied by MDTP data in the memory. At 540, a media data file space table can be created based on the media data file space information response. At 550, the MDTP data can be read substantially directly or directly from the memory based on the media data file space table.

For example, when accessing the MDTP data from the memory, such as by a MDTP module, a media player, or other application, a media data file space table can be used to efficiently access the data. A media data file space table can be used to read the MDTP data from memory substantially directly to a MDTP data synchronization application, a MDTP data transfer application, a media player, or other MDTP application. To elaborate, a request can be sent to a file system module for media data file space information regarding MDTP data in the memory. The file system module can provide a media data file space information response. The media data file space information response can include memory space addresses and lengths of memory spaces occupied by MDTP data in the memory. A media data file space table can be created based on the media data file space information response. The MDTP data, such as MDTP bulk data, can be read substantially directly or directly from the memory based on the media data file space table. At 560, the flowchart 500 can end.

Figure 6:
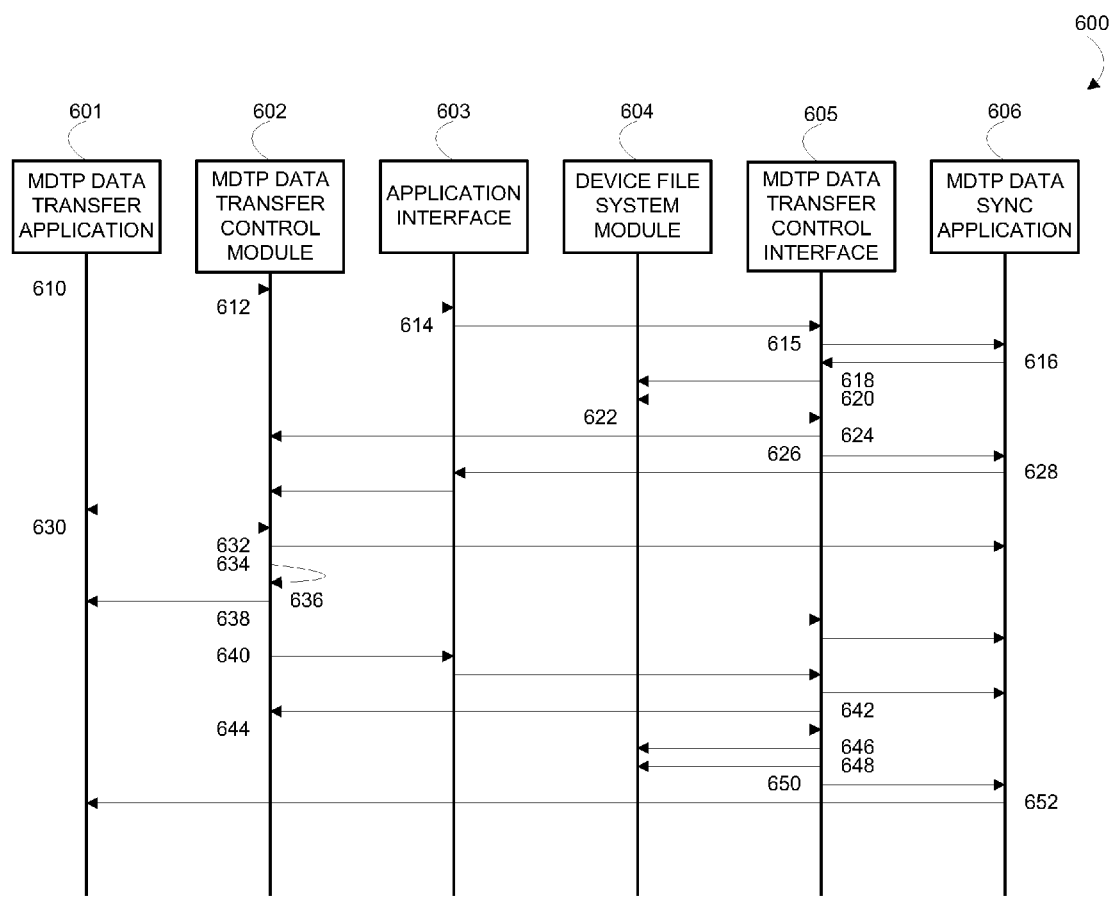
FIG. 6 is an exemplary signal flow diagram illustrating the operation of another embodiment.

FIG. 6 is an exemplary signal flow diagram 600 illustrating the operation of another related embodiment. The signal flow diagram 600 illustrates signals that can transfer between a MDTP data transfer application 601, a MDTP data transfer control module 602, an application interface 603, a device file system module 604, a MDTP data transfer control interface 605, and a MDTP data synchronization application 606.

At 610, the MDTP data transfer application 601 can send a MDTP command for sending media data and a corresponding description to the MDTP data transfer control module 602. At 612, 614, and 615 the MDTP data transfer control module 602 can pass MDTP commands to the MDTP data synchronization application 606 via a MDTP data transfer control interface that can be part of a device translation layer, via the application interface 603, and via the MDTP data transfer control interface 605. At 616, the MDTP data synchronization application 606 can receive the MDTP command and a descriptor containing size of a file to be transferred and can enable the MDTP data transfer control interface 605 and subsequently the MDTP data transfer control module 602 to handle the next send media data transaction via the MDTP data transfer control interface 605.

At 618, MDTP data transfer control interface 605 can create a new empty file in memory by issuing a File Create command to the device file system module 604. At 620, the MDTP data transfer control interface 605 can query the device file system module 604 about the structure of empty spaces available in memory. At 622, the device file system module 604 can reply with an Empty Space Table (EST), which can contain memory empty space addresses/lengths to be used by MDTP data transfer control module 602 for contiguous memory writes. At 624, the MDTP data transfer control interface 605 can send an EST download command to MDTP data transfer control module 602. The MDTP data transfer control module 602 can accept EST information and initialize its own corresponding local copy of the EST, which may be valid only during the current bulk data transfer. The MDTP data transfer control interface 605 can also send a start bulk data transfer command to MDTP data transfer control module 602.

At 626, the MDTP data transfer control interface 605 can acknowledge to the MDTP data synchronization application 606 that media data transfer is enabled for next send media data transaction. At 628, the MDTP data synchronization application 606 can acknowledge to the MDTP data transfer application 601, via the application interface 603 and via the MDTP data transfer control module 602, that it received the send media data command and descriptor. At 630, the MDTP data transfer application 601 can start media data transfer using a send media data operation request that can be intercepted by the MDTP data transfer control module 602. The MDTP data transfer control module 602 may not send the send media data operation request to the MDTP data synchronization application 606. All bulk data transfers can instead be sent to a memory by the MDTP data transfer control module 602. Optionally, at 632, metadata can be extracted from the sent bulk data and sent to the MDTP data synchronization application 606 for parallel database updates.

At 634, the MDTP data transfer control module 602 can use next empty spaces as described in the EST to prepare next bulk data writes into the memory and the EST can be updated to reflect data written. Bulk data received from MDTP data transfer application 601 can be written into memory according to information in the EST. At 636, the MDTP data transfer control module 602 can acknowledge bulk data transfers. At 638, the MDTP data transfer control module 602 can send statistics update messages to the MDTP data synchronization application 606, which can provide for timely updates of a displayed progress bar and other information. The MDTP data transfer control module 602 can also monitor the amount of data yet to be transferred from the MDTP data transfer application 601 into memory.

At 640, when all data is written, the MDTP data transfer control module 602 can send an end MDTP data transfer command to MDTP data transfer control interface 605 and the MDTP data synchronization application 606. At 642, in response to the end MDTP data transfer command, the MDTP data transfer control interface 605 can send a request to the MDTP data transfer control module 602 to upload its updated EST. At 644, the MDTP data transfer control module 602 can send its updated EST reflecting the end result of the completed MDTP data transfer to the MDTP data transfer control interface 605. At 646, the MDTP data transfer control interface 605 can prepare a file system update request based on the contents of uploaded EST and can execute the request using the device file system module 604. At 648, the MDTP data transfer control interface 605 can close the newly written file after the file system update is successful. At 650, the MDTP data transfer control interface 605 can notify the MDTP data synchronization application 606 that the send MDTP data transaction is complete and the newly written file is closed. At 652, the MDTP data synchronization application 606 can generate a response for the send MDTP data transaction and send it to the MDTP data transfer application 601 to notify it that the transaction was completed.

Thus, some embodiments can provide for increased performance of MDTPs, such as digital rights management-aware data transfer protocols, music synchronization data transfer protocols, and other data transfer protocols. For example, digital rights management-sensitive and digital rights management-insensitive data can be simultaneously transferred via two parallel data channels. This turbo MDTP architecture can increase MDTP throughput to the point of doubling it, to the point of throughput approaching that of a mass storage device, or to the point of even faster throughput, which can reduce media synchronization and transfer time. A turbo MDTP architecture can increase MDTP throughput by offloading bulk data transfer to a peripheral microcontroller chip, hardware module, or software module, that can act as a bridge between, for example, a universal serial bus-port, a flash media card-port, and a central processing unit-port. The turbo MDTP architecture can bypass limitations of a device file system using an empty space table. An empty space table can allow a block device, such as a peripheral microcontroller, to quickly write into a flash media card or other memory without referencing a file system for each individual physical write.

Some embodiments can increase media data transfer speeds over a digital rights management-aware protocol connection. Data flow using a digital rights management-aware data transfer protocol can use two distinctive flows of data. One flow of data can include data session configuration and setup, such as a digital rights management sensitive phase. Another flow of data can include bulk data transfer, such as a digital rights management insensitive phase. A media synchronization application can be responsible for maintaining digital rights management and overall data integrity and can retain control over the data session configuration and setup phase. The bulk media data transfer phase does not need to convey digital rights management sensitive information and therefore can be offloaded outside of the media synchronization application into another data transfer module, which can provide improved data throughput. For example, data traffic can be split over a digital rights management-aware protocol into digital rights management sensitive part and a digital rights management insensitive part. The digital rights management insensitive part can be offloaded to a MDTP data transfer control module separate from the media synchronization application.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   receiving media data transfer protocol data at a device;
   splitting the media data transfer protocol data in the device into media data transfer protocol control data and a media data transfer protocol bulk data;
   transferring the media data transfer protocol control data over a first channel in the device to a media data transfer protocol data synchronization application in the device; and
   transferring the media data transfer protocol bulk data over a second channel in the device substantially directly to memory substantially simultaneously with transferring the media data transfer protocol control data over the first channel.

2. The method according to claim 1, further comprising creating an empty space table based on empty spaces in the memory,
   wherein transferring the media data transfer protocol bulk data further comprises writing the media data transfer protocol bulk data substantially directly into the memory based on the empty space table.

3. The method according to claim 1, further comprising:
   creating, using a media data transfer protocol data transfer control interface, an empty space table based on empty spaces in the memory; and
   sending the empty space table from the media data transfer protocol data transfer control interface to a media data transfer protocol data transfer control module,
   wherein transferring the media data transfer protocol bulk data further comprises writing, using the media data transfer protocol data transfer control module, the media data transfer protocol bulk data directly into the memory based on the empty space table.

4. The method according to claim 3, further comprising sending data transfer updates from the media data transfer protocol data transfer control module to a media data transfer protocol data synchronization application.

5. The method according to claim 1, further comprising:
   requesting memory empty space information from a file system module;
   receiving a memory empty space information response from the file system module, the memory empty space information response including empty spaces addresses and lengths in the memory; and
   creating an empty space table based on the memory empty space information response,
   wherein transferring the media data transfer protocol bulk data further comprises writing the media data transfer protocol bulk data substantially directly into the memory based on the empty space table.

6. The method according to claim 1, wherein transferring the media data transfer protocol control data comprises transferring the media data transfer protocol control data using digital rights management-aware protocol to a media data transfer protocol data synchronization application.

7. The method according to claim 6, wherein transferring the media data transfer protocol bulk data is performed over a second channel parallel to the first channel and external to the media data transfer protocol data synchronization application.

8. The method according to claim 1, further comprising:
   sending a request for media data file space information regarding media data transfer protocol data in the memory;
   receiving a media data file space information response including memory space addresses and lengths of memory spaces occupied by media data transfer protocol data in the memory;
   creating a media data file space table based on the media data file space information response; and reading the media data transfer protocol data substantially directly from the memory based on the media data file space table.

9. An apparatus comprising:
a data transfer port configured to receive media data transfer protocol data;
a controller including a media data transfer protocol data synchronization application configured to process the media data transfer protocol data received via the port;
a memory configured to store the media data transfer protocol data; and
a media data transfer protocol data transfer control module coupled to the data transfer port, the controller, and the memory, the media data transfer protocol data transfer control module configured to split the media data transfer protocol data in the apparatus into media data transfer protocol control data and media data transfer protocol bulk data, configured to transfer the media data transfer protocol control data over a first channel in the apparatus to the media data transfer protocol data synchronization application, and configured to transfer the media data transfer protocol bulk data over a second channel in the apparatus substantially directly to the memory substantially simultaneously with transferring the media data transfer protocol control data over the first channel to the media data transfer protocol data synchronization application.

10. The apparatus according to claim 9, wherein the controller includes the media data transfer protocol data transfer control module.

11. The apparatus according to claim 9, further comprising a second controller including the media data transfer protocol data transfer control module.

12. The apparatus according to claim 9,
wherein the media data transfer protocol data transfer control module is configured to create an empty space table based on empty spaces in the memory, and
wherein the media data transfer protocol data transfer control module is configured to transfer the media data transfer protocol bulk data by writing the media data transfer protocol bulk data substantially directly into the memory based on the empty space table.

13. The apparatus according to claim 9, further comprising:
a media data transfer protocol data transfer control interface configured to create an empty space table based on empty spaces in the memory and send the empty space table to the media data transfer protocol data transfer control module,
wherein the media data transfer protocol data transfer control module is configured to transfer the media data transfer protocol bulk data by writing the media data transfer protocol bulk data directly into the memory based on the empty space table.

14. The apparatus according to claim 13, wherein the media data transfer protocol data transfer control module is configured to send data transfer updates to the media data transfer protocol data synchronization application.

15. The apparatus according to claim 9, further comprising
a file system module configured to manage memory storage space; and
a media data transfer protocol data transfer control interface configured to request memory empty space information from the file system module, configured to receive a memory empty space information response from the file system module, the memory empty space information response including empty space addresses and lengths in the memory, and configured to create an empty space table based on the memory empty space information response,
wherein the media data transfer protocol data transfer control module is configured to transfer the media data transfer protocol bulk data by writing the media data transfer protocol bulk data substantially directly into the memory based on the empty space table.

16. The apparatus according to claim 9, wherein the media data transfer protocol data transfer control module is configured to transfer the media data transfer protocol control data using digital rights management-aware protocol to the media data transfer protocol data synchronization application.

17. The apparatus according to claim 16, wherein the media data transfer protocol data transfer control module is configured to transfer the media data transfer protocol bulk data over a second channel parallel to the first channel and external to the media data transfer protocol data synchronization application.

18. The apparatus according to claim 9, further comprising:
a file system module configured to manage memory storage space; and
a media data transfer protocol data transfer control interface configured to send a request to the file system module for media data file space information regarding media data transfer protocol data in the memory, configured to receive a media data file space information response from the file system module, the media data file space information response including memory space addresses and lengths of memory spaces occupied by media data transfer protocol data in the memory, configured to create a media data file space table based on the media data file space information response, and configured to read the media data transfer protocol data substantially directly from the memory based on the media data file space table.

19. An apparatus comprising:
a data transfer port configured to receive media data transfer protocol data including media data;
a controller including a media data transfer protocol media synchronization application configured to process the media data transfer protocol data received via the data transfer port;
a memory coupled to the controller, the memory configured to store media data transfer protocol bulk data; and
a media data transfer protocol media transfer control module coupled to the data transfer port, the controller, and the memory, the media data transfer protocol media transfer control module configured to split the media data transfer protocol data in the apparatus into media data transfer protocol control data and media data transfer protocol bulk data, configured to transfer the media data transfer protocol control data over a first channel in the apparatus to the media data transfer protocol data synchronization application, and configured to transfer the media data transfer protocol bulk data over a second channel in the apparatus substantially directly to the memory while transferring the media data transfer protocol control data over the first channel to the media data transfer protocol data synchronization application.

20. The apparatus according to claim 19,
wherein the media data transfer protocol media transfer control module is configured to create an empty space table based on empty spaces in the memory, and
wherein media data transfer protocol media transfer control module is configured to transfer the media data transfer protocol bulk data by writing the media data transfer protocol bulk data substantially directly into the memory based on the empty space table.

* * * * *